United States Patent
Fukushima et al.

(10) Patent No.: US 8,414,967 B2
(45) Date of Patent: Apr. 9, 2013

(54) PROCESS FOR PRODUCING MAGNETIC RECORDING MEDIUM AND MAGNETIC RECORDING AND REPRODUCING APPARATUS

(75) Inventors: Masato Fukushima, Ichihara (JP); Akira Sakawaki, Ichihara (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/812,539

(22) PCT Filed: Jan. 9, 2009

(86) PCT No.: PCT/JP2009/050177
§ 371 (c)(1),
(2), (4) Date: Jul. 12, 2010

(87) PCT Pub. No.: WO2009/088060
PCT Pub. Date: Jul. 16, 2009

(65) Prior Publication Data
US 2010/0284108 A1    Nov. 11, 2010

(30) Foreign Application Priority Data
Jan. 11, 2008  (JP) ................. 2008-003941

(51) Int. Cl.
*G11B 5/74*   (2006.01)
(52) U.S. Cl. .................... 427/127; 427/130
(58) Field of Classification Search ......... 427/127, 427/130, 132; 428/826, 829, 831
See application file for complete search history.

(56) References Cited

U.S. PATENT DOCUMENTS

| | | | |
|---|---|---|---|
| 6,841,224 | B2 | 1/2005 | Kamata et al. |
| 7,067,207 | B2 | 6/2006 | Kamata et al. |
| 7,147,790 | B2 | 12/2006 | Wachenschwanz et al. |
| 7,161,753 | B2 | 1/2007 | Wachenschwanz et al. |
| 7,166,261 | B2 | 1/2007 | Kamata et al. |
| 7,232,621 | B2 | 6/2007 | Kamata et al. |
| 7,549,209 | B2 | 6/2009 | Wachenschwanz et al. |

(Continued)

FOREIGN PATENT DOCUMENTS

| | | |
|---|---|---|
| JP | 05-205257 A | 8/1993 |
| JP | 2002-359138 A | 12/2002 |

(Continued)

*Primary Examiner* — Michael Cleveland
*Assistant Examiner* — Tabassom Tadayyon Eslami
(74) *Attorney, Agent, or Firm* — Sughrue Mion, PLLC

(57) ABSTRACT

A method for producing a magnetic recording medium having a magnetically partitioned magnetic recording pattern, comprising a step of forming a magnetic layer contains 0.5-6 atomic % of an oxide on a non-magnetic substrate; and a step of exposing regions of the magnetic layer, which magnetically partition the magnetic recording pattern, to a reactive plasma or reactive ion. The magnetic layer preferably has a non-granular structure, and in-plane orientated. After the step of exposure of the magnetic layer to a reactive plasma or reactive ion, a surface at least in said regions of magnetic layer having been exposed to the reactive plasma or reactive ion is preferably irradiated with an inert gas. Thus, a magnetic recording medium having a magnetic recording pattern with a high precision, and having high electromagnetic conversion characteristics and high recording density can be produced with an enhanced productivity.

10 Claims, 5 Drawing Sheets

U.S. PATENT DOCUMENTS

| | | | |
|---|---|---|---|
| 2002/0142192 A1 | 10/2002 | Kamata et al. | |
| 2003/0219629 A1* | 11/2003 | Moriwaki et al. | 428/694 R |
| 2004/0091748 A1 | 5/2004 | Kamata et al. | |
| 2004/0191557 A1 | 9/2004 | Kamata et al. | |
| 2004/0258833 A1 | 12/2004 | Kamata et al. | |
| 2005/0069732 A1* | 3/2005 | Kamata et al. | 428/694 TC |
| 2005/0120545 A1 | 6/2005 | Wachenschwanz et al. | |
| 2005/0153169 A1* | 7/2005 | Watanabe et al. | 428/694 BM |
| 2005/0186357 A1* | 8/2005 | Hattori et al. | 427/548 |
| 2006/0171051 A1 | 8/2006 | Wachenschwanz et al. | |
| 2006/0222898 A1 | 10/2006 | Ichihara | |
| 2007/0230055 A1 | 10/2007 | Shirotori et al. | |
| 2008/0026252 A1* | 1/2008 | Sonoda et al. | 428/810 |

FOREIGN PATENT DOCUMENTS

| | | |
|---|---|---|
| JP | 2004-164692 A | 6/2004 |
| JP | 2004-178793 A | 6/2004 |
| JP | 2004-178794 A | 6/2004 |
| JP | 2006-155863 A | 6/2006 |
| JP | 2006-209952 A | 8/2006 |
| JP | 2006-286159 A | 10/2006 |
| JP | 2006-309841 A | 11/2006 |
| JP | 2007-272948 A | 10/2007 |
| JP | 2007-273067 A | 10/2007 |
| JP | 2007-287322 A | 11/2007 |
| WO | 2007/091702 A1 | 8/2007 |

* cited by examiner

Step A

Step B

Step C

Step D

Step E

PROCESS FOR PRODUCING MAGNETIC RECORDING MEDIUM AND MAGNETIC RECORDING AND REPRODUCING APPARATUS

TECHNICAL FIELD

This invention relates to a process for producing a magnetic recording medium used for a magnetic recording and reproducing apparatus such as a hard disk apparatus. It further relates to a magnetic recording and reproducing apparatus.

BACKGROUND ART

In recent years, magnetic recording apparatuses such as a magnetic disk apparatus, a flexible disk apparatus and a magnetic tape apparatus are widely used with their importance being increasing. Recording density of a magnetic recording medium used in the magnetic recording apparatus is greatly enhanced. Especially, since the development of MR head and PRML technique, the areal recording density is more and more increasing. Recently GMR head and TMR head have been developed, and the rate of increase in the areal recording density is about 100% per year. There is still increasing a demand for further enhancing the recording density, and therefore, a magnetic layer having a higher coercive force, and a higher signal-to-noise ratio (SNR) and a high resolution are eagerly desired.

An attempt of increasing the track density together with an increase of a liner recording density to enhance an areal recording density is also being made.

In a recent magnetic recording apparatus, the track density has reached about 110 kTPI. However, with an increase of the track density, magnetic recording information is liable to interfering with each other between adjacent tracks, and magnetization transition regions in the boundary regions thereof as a noise source tend to impair the SNR. These problems result in lowering in bit error rate and impede the enhancement of the recording density.

To enhance the areal recording density, it is required to render small the size of each recording bit and give the maximum saturated magnetization and magnetic film thickness to each recording bit. However, with a decrease in the bit size, the minimum magnetization volume per bit becomes small, and the recorded data are tend to disappear due to magnetization reversal caused by heat fluctuation.

Further, in view of the reduction in distance between the adjacent tracks, a high-precision track servo system technology is required for the magnetic recording apparatus, and an operation is generally adopted wherein recording is carried out widely but the reproduction is carried out narrowly so that the influence of the adjacent tracks is minimized. This operation is advantageous in that the influence of the adjacent tracks can be minimized, but it is disadvantageous in that the reproduction output is rather low. This also leads to difficulty in enhancement of the SNR to a desired high level.

To reduce the heat fluctuation, maintain the desired SNR and obtain the desired reproduction output, a proposal has been made wherein elevations and depressions are formed, which extend along the tracks on a surface of a magnetic recording medium, so that each of patterned tracks on the elevations is partitioned by the depressions whereby the track density is enhanced. This type of magnetic recording media is hereinafter referred to as a discrete track media, and the technique for providing this type of magnetic recording media is hereinafter referred to as a discrete track method.

Further, an attempt is being made for dividing the data region in the same track, i.e., providing patterned media.

An example of the discrete track medium is a magnetic recording medium disclosed in patent document 1, which is made by providing a non-magnetic substrate having a pattern with elevations and depressions formed on the surface thereof, and forming a magnetic layer having a corresponding surface configuration on the non-magnetic substrate, to give physically discrete magnetic recording tracks and servo signal patterns (see, for example, patent document 1).

The above-mentioned magnetic recording medium has a multilayer structure such that a ferromagnetic layer is formed via a soft magnetic underlayer on the non-magnetic substrate having the pattern with elevations and depressions formed on the surface thereof, and an overcoat is formed on the ferromagnetic layer. The magnetic recording patterned regions form magnetic recording regions on the elevations physically partitioned from the surrounding regions.

In the above-mentioned magnetic recording medium, the occurrence of ferromagnetic domain wall in the soft magnetic underlayer can be prevented or minimized and therefore the influence due to the heat fluctuation is reduced and the interfere between the adjacent signals is minimized with the result of provision of a magnetic recording medium with high recording density exhibiting a large SNR.

The discrete track method includes two type of methods: a first type is drawn to a method wherein tracks are formed after the formation of a multilayer magnetic recording medium comprising several laminated films; and a second type is drawn to a method wherein patterns having elevations and depressions are formed directly on a substrate or formed on a film layer for forming tracks thereon, and then a multilayer magnetic recording medium is formed using the patterned substrate or the patterned film layer (see, for example, patent document 2 and patent document 3).

Another discrete track method has been proposed in patent documents 4, 5 and 6. In the proposed method, a previously formed magnetic layer is, for example, subjected to an implantation of nitrogen ion or oxygen ion or irradiated with laser whereby regions having modified magnetic properties and partitioning magnetic tracks in a discrete track medium are formed.

Further, a method of producing a magnetic recording medium has been proposed, which comprises a step of forming a magnetic layer having a granular structure as a discrete track medium (see patent document 7).

Further, another method for forming a magnetic pattern has been proposed in patent document 8, which comprises a step of exposing regions of the surface of a ferromagnetic layer to a halogen-containing reactive gas whereby CoO contained in the ferromagnetic layer in a discrete track medium is halogenized in said exposed regions of ferromagnetic layer to be thereby rendered non-ferromagnetic.

Patent document 1 JP 2004-164692 A1
Patent document 2 JP 2004-178793 A1
Patent document 3 JP 2004-178794 A1
Patent document 4 JP H5-205257 A1
Patent document 5 JP 2006-209952 A1
Patent document 6 JP 2006-31849 A1
Patent document 7 JP 2006-155863 A1
Patent document 8 JP 2002-359138 A1

DISCLOSURE OF THE INVENTION

Problems to be Solved by the Invention

For the production of the above-mentioned discrete track media and patterned media, which have a magnetically partitioned magnetic recording pattern, there is often adopted a step of exposing portions of a magnetic layer to a reactive plasma or a reactive ion using oxygen or a halogen.

The present inventors have found that the formation of a magnetic recording pattern using the reactive plasma or the reactive ion has problems in that the modification of the magnetic properties in specific regions of the magnetic layer requires a substantially long time and therefore the productivity is reduced, and further, each modified region spreads out with an increase in depth, and consequently, a desired clear pattern is difficult to form and the image of pattern often becomes blurred.

A primary object of the present invention is to solve the above-mentioned problems and to provide a method for producing a magnetic recording medium wherein a high reactivity is attained between a reactive plasma or a reactive ion and the regions of the magnetic layer which magnetically partition the magnetic recording pattern, and an image of magnetic recording pattern does not become blurred.

Means for Solving the Problems

Researches, made by the inventors, for achieving the above-mentioned object revealed that the above-mentioned improved magnetic recording medium can be produced by the following methods. Thus, the present invention has been completed.

In accordance with the present invention, there are provided the following methods for producing a magnetic recording medium.

(1) A method for producing a magnetic recording medium having a magnetically partitioned magnetic recording pattern, characterized by comprising a step of forming a magnetic layer on anon-magnetic substrate, which layer contains an oxide in an amount in the range of 0.5 atomic % to 6 atomic %, based on the magnetic layer; and a step of exposing regions of the magnetic layer, which magnetically partition the magnetic recording pattern, to a reactive plasma or a reactive ion.

(2) The method for producing a magnetic recording medium as mentioned above in (1), wherein the magnetic layer containing 0.5 atomic % to 6 atomic % of an oxide has a non-granular structure.

(3) The method for producing a magnetic recording medium as mentioned above in (1) or (2), wherein the magnetic layer containing 0.5 atomic % to 6 atomic % of an oxide is an in-plane orientated magnetic layer.

(4) The method for producing a magnetic recording medium as mentioned above in any one of (1) to (3), wherein the oxide is at least one oxide selected from the group consisting of $SiO_2$, $TiO_2$, $WO_2$, $WO_2$ and $Cr_2O_3$.

(5) The method for producing a magnetic recording medium as mentioned above in any one of (1) to (4), wherein the reactive plasma or the reactive ion contains a halogen ion.

(6) The method for producing a magnetic recording medium as mentioned above in (5), wherein the halogen ion is a halogen ion produced by introducing at least one gaseous halide selected from the group consisting of $CF_4$, $SF_6$, $CHF_3$, $CCl_4$ and $KBr$ into the reactive plasma or the reactive ion.

(7) The method for producing a magnetic recording medium as mentioned above in any one of (1) to (6), which further comprises a step of, after the step of exposing said regions of the magnetic layer to a reactive plasma or a reactive ion, exposing said regions of magnetic layer having been exposed to a reactive plasma or a reactive ion, to an oxygen plasma.

(8) The method for producing a magnetic recording medium as mentioned above in any one of (1) to (7), wherein said regions of the magnetic layer to be exposed to a reactive plasma or a reactive ion are surface portions of the magnetic layer.

(9) The method for producing a magnetic recording medium as mentioned above in any one of (1) to (7), wherein surface layer portions in said regions of magnetic layer to be exposed to a reactive plasma or a reactive ion are removed, and then, the surface portions of the magnetic layer which have been newly exposed by the removal of the surface layer portions, are exposed to a reactive plasma or a reactive ion.

(10) The method for producing a magnetic recording medium as mentioned above in (9), wherein the removal of the surface layer portions in said regions of magnetic layer to be exposed to a reactive plasma or a reactive ion is effected to an extent such that surface layer portions having a thickness in the range of 0.1 to 15 nm are removed.

(11) The method for producing a magnetic recording medium as mentioned above in any one of (1) to (10), which further comprises a step of, after the step of exposing said regions of the magnetic layer to a reactive plasma or a reactive ion, irradiating with an inert gas a surface at least in said regions of magnetic layer having been exposed to the reactive plasma or the reactive ion.

In accordance with the present invention, there is further provided the following magnetic recording and reproducing apparatus.

(12) A magnetic recording and reproducing apparatus characterized by comprising, in combination, the magnetic recording medium produced by the method as mentioned above in any one of (1) to (11); a driving part for driving the magnetic recording medium in the recording direction; a magnetic head comprising a recording part and a reproducing part; means for moving the magnetic head in a relative motion to the magnetic recording medium; and a recording-and-reproducing signal treating means for inputting signal to the magnetic head and for reproducing output signal from the magnetic head.

Effect of the Invention

According to the present invention drawn to a method for producing a magnetic recording medium, a magnetic recording pattern having a high precision can be formed on a magnetic recording pattern with a high efficiency. Therefore, a magnetic recording medium exhibiting high electromagnetic conversion characteristics and having a high recording density can be produced with an enhanced productivity.

REFERENCE NUMERALS

Figure 3:
FIG. 3 is a flow-sheet of the first-half steps for producing a magnetic recording medium according to the present invention.
Figure 3:
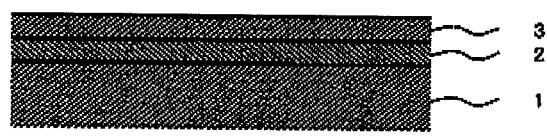
Figure 3:
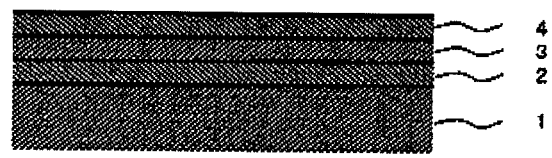
Figure 3:
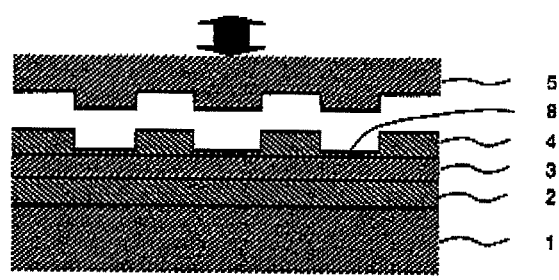
Figure 3:
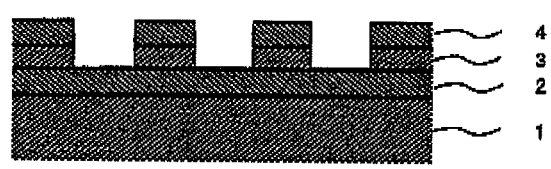
Figure 4:
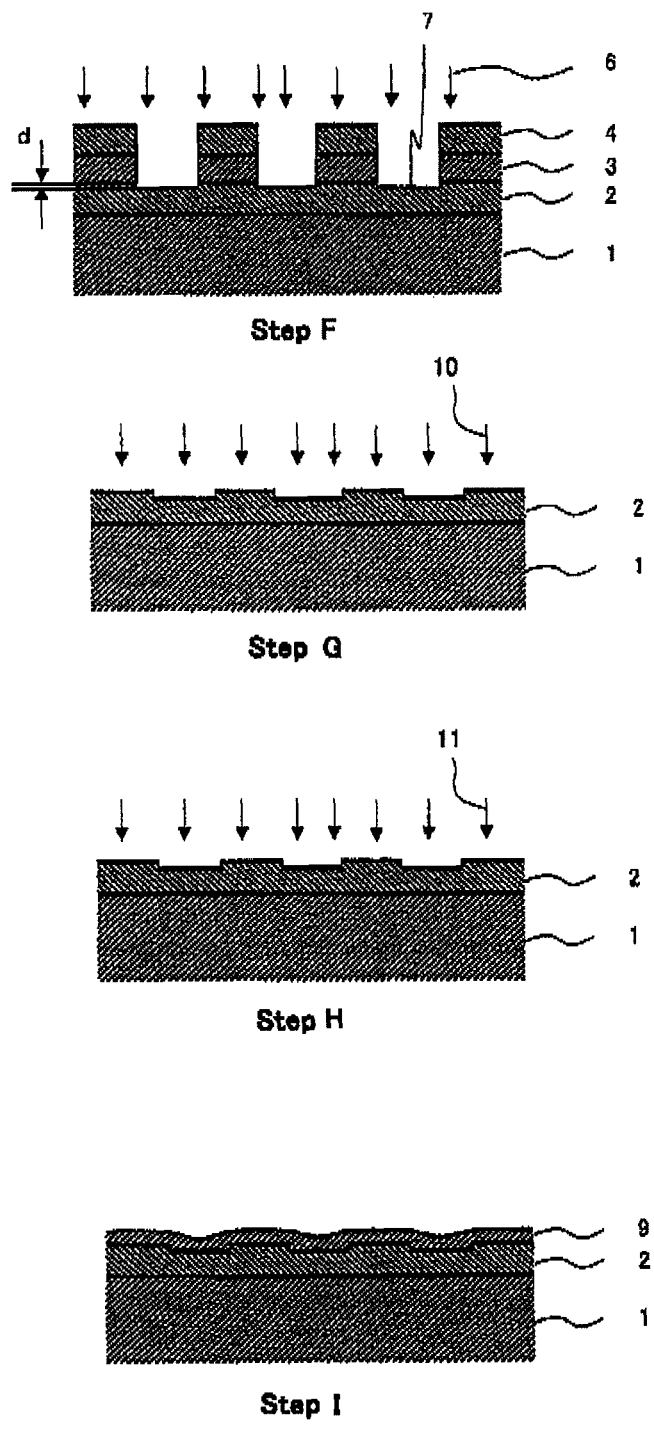
FIG. 4 is a flow-sheet of the second-half steps for producing a magnetic recording medium according to the present invention.
Figure 5:
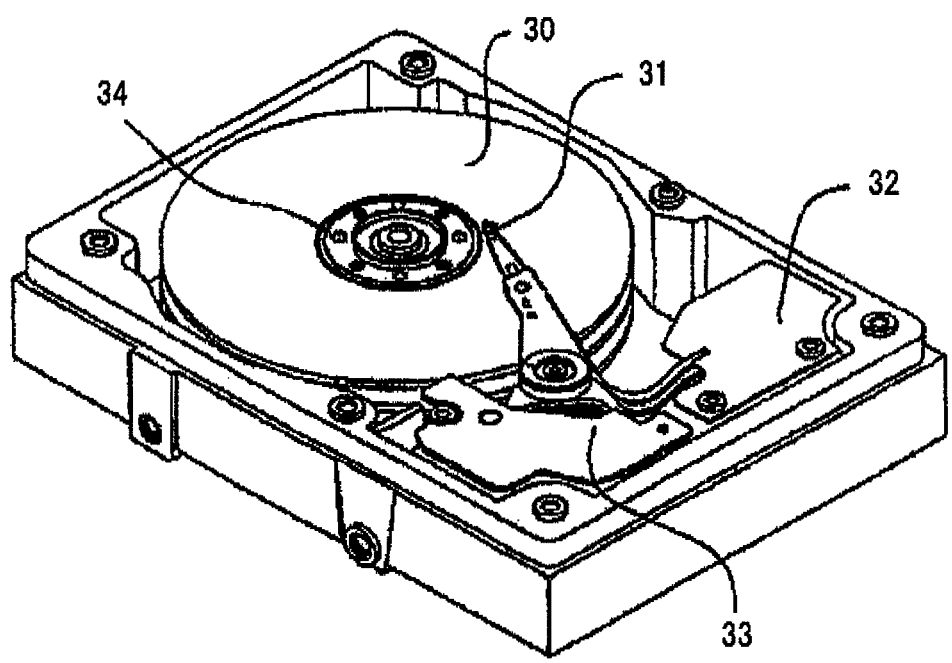
FIG. 5 is a schematic illustration of the magnetic recording-reproducing apparatus according to the present invention.

In FIGS. 1, 2, 3 and 4,
1 Non-magnetic substrate
2 Magnetic layer
3 Mask layer
4 Resist layer
5 Stamp
6 Milling ion
7 Region from which surface layer portion of magnetic layer have been partially removed
d Depth of region from which surface layer portion of magnetic layer has been partially removed, i.e., thickness of removed surface layer portion of magnetic layer.
8 Depression in resist layer, formed by pressing
9 Protective overcoat
10 Reactive plasma or reactive ion
11 Inert gas
21 Magnetically modified region or demagnetized region.
22 Surface of magnetic layer
23 Surface exposed by removal of surface layer portion
24 Depression
W Width of magnetic region in magnetic recording pattern
L Width of non-magnetic region in magnetic recording pattern
In FIG. 5,
30 Magnetic recording medium
31 Magnetic head
32 Recording-reproducing signal system
33 Head-driving part
34 Medium-driving part
30 Magnetic recording medium

BEST MODE FOR CARRYING OUT THE INVENTION

The present invention is concerned with a method for producing a magnetic recording medium having a magnetically partitioned magnetic recording pattern, characterized by comprising a step of forming a magnetic layer on a non-magnetic substrate, which layer contains an oxide in an amount in the range of 0.5 atomic % to 6 atomic %, based on the magnetic layer; and a step of exposing regions of the magnetic layer, which magnetically partition the magnetic recording pattern, to a reactive plasma or a reactive ion; said two steps being conducted in this order.

The inventors have found that, in the case when the magnetic layer contains an oxide in an amount in the range of 0.5 atomic % to 6 atomic %, the reactivity of the magnetic layer with a reactive plasma or a reactive ion increases, therefore, the magnetic characteristics of the magnetic layer can easily be modified. More specifically, when a mask pattern is formed on the magnetic layer and the surface thereof is exposed to a reactive plasma or a reactive ion, magnetic characteristics in the negative regions of the mask pattern (i.e., the regions partitioning a magnetic recording pattern to be formed on the magnetic layer) can be modified or demagnetized within a short period of time. Furthermore, when the magnetic layer contains an oxide, a pattern formed at the exposure to a reactive plasma or a reactive ion is sharp and the resulting magnetic recording pattern has an enhanced precision. When the amount of oxide is lower than 0.5 atomic %, the reactivity does not increase to any appreciable extent. In contrast, when the amount of oxide is larger than 6 atomic %, the image of pattern tends to be blurred.

In the case when a magnetic layer has a granular structure, the reactivity of the magnetic layer with a reactive plasma or a reactive ion tends to undesirably increase and the reacted regions extend too broad with the result that a pattern formed at the exposure to a reactive plasma or a reactive ion is liable to be blurred. In general a magnetic layer having a granular structure contains an oxide in an amount larger than 6 atomic %.

It is preferable in the present invention that the magnetic layer containing 0.5 to 6 atomic % of an oxide has a non-granular structure because a sharp and clear image of magnetic recording pattern can be more stably formed. In the magnetic layer having a non-granular structure, the magnetic crystal grains are not covered with the oxide. This is in contrast to the magnetic layer having a granular structure wherein the magnetic crystal grains are generally covered with the oxide.

The inventors have found further that, in the case when the magnetic layer containing 0.5 to 6 atomic % of an oxide is an in-plane orientated magnetic layer, the pattern formed at the exposure to a reactive plasma or a reactive ion is more sharp than the pattern formed when a magnetic layer containing 0.5 to 6 atomic % of an oxide is a perpendicularly orientated magnetic layer. It is presumed that the orientation in the (002) direction of magnetic crystal grains constituting the magnetic layer influences the reactivity of the grains with a reactive plasma or a reactive ion. More specifically, in the case when the magnetic layer containing 0.5 to 6 atomic % of an oxide is an in-plane orientated magnetic layer, the reaction of the grains with a reactive plasma or a reactive ion proceeds predominantly in the thickness direction (i.e., perpendicular direction) of film thickness, and the rate of reaction in the directions normal to the thickness direction is slower than that in the thickness direction, with the result that the pattern formed at the exposure to a reactive plasma or a reactive ion becomes sharp. It is further presumed that the reaction of magnetic grains with a reactive plasma or a reactive ion proceeds in a state of pits and in conformity with the pattern thereby leading to the formation of a sharp magnetic recording pattern on the magnetic layer.

In the present invention, the oxide contained in the magnetic layer is preferably at least one oxide selected from the group consisting of $SiO_2$, $TiO_2$, $WO_2$, $WO_3$ and $Cr_2O_3$ in view of high reactivity of the magnetic layer with a reactive plasma or a reactive ion, and high sharpness in the pattern formed at the exposure thereto.

The reactive plasma or the reactive ion preferably contains a halogen ion. The halogen ion is preferably a halogen ion produced by introducing at least one gaseous halide selected from the group consisting of $CF_4$, $SF_6$, $CHF_3$, $CCl_4$ and KBr into the reactive plasma.

The production method of the present invention preferably further comprises a step of, after the step of exposing the regions of the magnetic layer to a reactive plasma or a reactive ion, exposing said regions of magnetic layer having been exposed to a reactive plasma or a reactive ion, to an oxygen plasma. This treatment of exposing to a oxygen plasma results in a magnetic recording pattern having regions with more clearly modified magnetic characteristics.

The method of the present invention for producing a magnetic recording medium having a magnetically partitioned magnetic recording pattern is characterized by comprising a step of forming the above-mentioned magnetic layer on a non-magnetic substrate, and a step of exposing regions (surface portions) of the magnetic layer, which magnetically partition the magnetic recording pattern, to a reactive plasma or a reactive ion; wherein the two steps are conducted in this order.

It is preferable that surface layer portions in the regions of magnetic layer to be exposed to a reactive plasma or a reactive ion are removed by, for example, ion milling, and then, the surface portions of the magnetic layer which have been newly exposed by the removal of the surface layer portions, are exposed to a reactive plasma or a reactive ion.

It is also preferable to conduct a step of, after the step of exposing the regions of the magnetic layer to a reactive plasma or a reactive ion, irradiating with an inert gas a surface at least in said regions of magnetic layer having been exposed to the reactive plasma or the reactive ion.

The regions of the magnetic layer to be exposed to a reactive plasma or a reactive ion are preferably treated so that surface layer portions in the regions of magnetic layer are removed by, for example, ion milling, and then, the surface portions of the magnetic layer which have been newly exposed by the removal of the surface layer portions, are exposed to a reactive plasma or a reactive ion whereby the regions having modified magnetic characteristics (or the demagnetized regions) for partitioning a magnetic recording pattern are formed.

Figure 1:
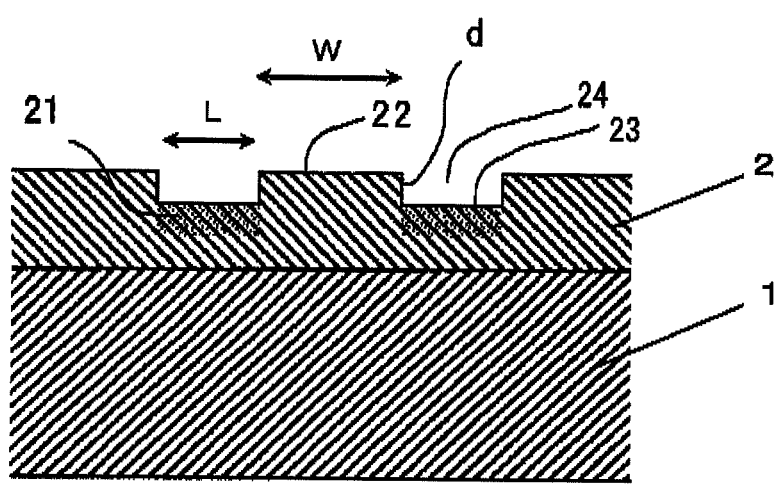
FIG. 1 illustrates a cross-section of one example of a laminate structure comprising a substrate and a magnetic layer in the magnetic recording medium produced according to the present invention.
Figure 2:
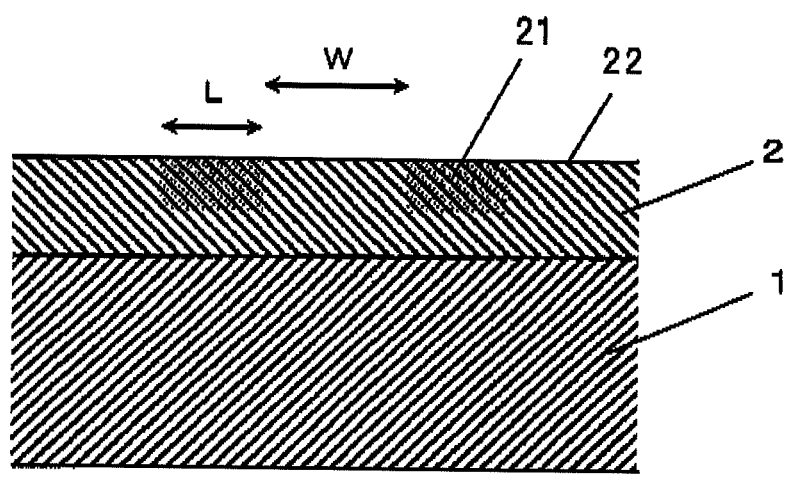
FIG. 2 illustrates a cross-section of another example of a laminate structure comprising a substrate and a magnetic layer in the magnetic recording medium produced according to the present invention.

The structure of the magnetic layer with the regions having magnetic characteristics modified, or the regions demagnetized, by the exposure to a reactive plasma or a reactive ion is illustrated in FIG. 1 and FIG. 2.

The structure illustrated in FIG. 1 has magnetically modified regions or demagnetized regions 21 in the magnetic layer 2 formed on a non-magnetic substrate 1, which regions 21 are formed by a process of removing surface layer portions of the magnetic layer 2 and then exposing the surface portions 23, newly exposed by the removal of the surface layer portions, to a reactive plasma or a reactive ion.

The structure illustrated in FIG. 2 has magnetically modified regions or demagnetized regions 21 in the magnetic layer 2 formed on a non-magnetic substrate 1, which regions 21 are formed by a process of exposing surface layer portions of the magnetic layer 2 to a reactive plasma or a reactive ion, without pre-treatment of removing the surface layer portions.

In FIG. 1 and FIG. 2, the reference numerals indicate the following parts or elements.

1 Non-magnetic substrate
2 Magnetic layer
21 Magnetically modified regions or demagnetized regions
22 Surface portions of the magnetic layer, which are separated or partitioned by the magnetically modified regions or demagnetized regions 21
23 Surface portions exposed by removal of surface layer portions of the magnetic layer
24 Depressions formed by removal of surface layer portions of the magnetic layer
W refers to width of magnetic regions in a magnetic recording pattern, and L refers to width of non-magnetic regions in the magnetic recording pattern. W is preferably not larger than 200 nm, and L is preferably not larger than 100 nm, and thus, a track pitch (i.e., the sum of W+L) is not larger than 300 nm.

Researches, made by the inventors, revealed that the surface layer portions in the regions of the magnetic layer which have been exposed to a reactive plasma or a reactive ion, are oxidized or halogenated by the reactive plasma or reactive ion using oxygen or a halogen, and thus, the exposed surface portions of the magnetic layer are activated, and consequently, the environmental resistance of a resulting magnetic recording medium often becomes deteriorated. More specifically, magnetic metal grains such as cobalt grains, activated by the exposure to a reactive plasma or a reactive ion, tend to migrate and partly protrude from the surface of a protective carbon overcoat on the magnetic recording medium under high-temperature and high-humidity conditions, and occasionally cause injury to a head of a hard disk drive.

In the production process according to the present invention, the magnetic layer, which has been activated by the oxidation or halogenation with the reactive plasma or reactive ion, is preferably exposed to an inert gas irradiation, and consequently, the magnetic layer is stabilized and the migration of magnetic metal grains does not occur or occurs only to the minimum extent under high-temperature and high-humidity conditions.

By the term "magnetic recording pattern" as used in this specification is meant a magnetic recording pattern in a broad sense which include patterned media wherein magnetic recording patterns are arranged with a certain regularity per bit; media wherein magnetic recording patterns are arranged in tracks fashion; and servo signal patterns.

The process of the present invention is preferably adopted for the manufacture of a discrete type magnetic recoding medium in view of simplicity and ease, wherein the magnetically partitioned magnetic recording pattern involves magnetic recoding tracks and servo signal patterns.

The process for making the magnetic recording medium according to the present invention will be specifically described with reference to the accompanying FIG. 3 and FIG. 4.

The magnetic recording medium made has a multi-layer structure as illustrated in, for example, step I in FIG. 4, which comprises a non-magnetic substrate 1, a magnetic layer 2 formed on the substrate 1 and having a magnetic recording pattern, and an overcoat 9, which are formed in this order. In the magnetic recording medium produced by the process of the present invention, optional layers other than a non-magnetic substrate 1, a magnetic layer 2 and an overcoat 9 can be appropriately arranged according to the need. Thus, a soft magnetic underlayer and an intermediate layer (which are not shown in FIG. 4) may be formed between the non-magnetic substrate 1 and the magnetic layer 2. A lubricating film (not shown in FIG. 4) may be formed on the overcoat.

The non-magnetic substrate 1 used in the present invention is not particularly limited, and, as specific examples thereof, there can be mentioned aluminum alloy substrates predominantly comprised of aluminum such as, for example, an Al—Mg alloy substrate; and substrates made of ordinary soda glass, aluminosilicate glass, glass ceramics, silicon, titanium, ceramics, and organic resins. Of these, aluminum alloy substrates, glass substrates such as glass ceramics substrate, and silicon substrate are preferably used.

The non-magnetic substrate preferably has an average surface roughness (Ra) of not larger than 1 nm, more preferably not larger than 0.5 nm, and especially preferably not larger than 0.1 nm.

The magnetic layer 2, formed on a surface of the above-mentioned non-magnetic substrate 1 in the method of the present invention is characterized as containing 0.5 atomic % to 6 atomic %, based on the magnetic layer, of an oxide. The magnetic layer is preferably formed from an alloy predominantly comprised of cobalt.

The magnetic layer containing an oxide can be prepared by incorporating and combining an oxide with a magnetic alloy. The oxide incorporated in the magnetic alloy includes that is chemically bonded with the magnetic alloy, and that is present in the grain boundaries. The magnetic layer containing an oxide further includes a magnetic layer comprised of an oxygen-containing alloy formed by combining an oxygen atom directly with a magnetic alloy, such as, for example, CoCrPt—O.

As specific examples of the oxide incorporated in a magnetic alloy, there can be mentioned $SiO_2$, $TiO_2$, $WO_2$, $WO_3$, $Cr_2O_3$ and $Ta_2O_5$. These may be used in combination. Researches made by the present inventors revealed that CoO could not enhance to the desired extent the reactivity of the magnetic layer with a reactive plasma or a reactive ion. It is presumed that the bond between Co and O is strong and interferes the reaction of the magnetic layer with a reactive plasma or a reactive ion. Among the above-recited oxides, $SiO_2$, $TiO_2$, $WO_2$, $WO_3$ and $Cr_2O_3$ are preferable.

The oxygen-containing magnetic alloy constituting the magnetic layer containing an oxide preferably includes oxygen-containing cobalt alloys, which are prepared by combining a cobalt alloy such as CoCr, CoCrPt, CoCrPtB, CoCrPtB—X or CoCrPtB—X—Y (X represents an element such as Ru and W, and Y represents an element such as Cu and Mg), with an oxide selected from the above-mentioned oxides. As specific examples of the oxygen-containing cobalt alloys, there can be mentioned CoCrPt—O, CoCrPt—$SiO_2$, CoCrPt—$Cr_2O_3$, CoCrPt—$TiO_2$, CoCrPt—$ZrO_2$, CoCrPt—$Nb_2O_5$, CoCrPt—$Ta_2O_5$, CoCrPt—$Al_2O_3$, CoCrPt—$B_2O_3$, CoCrPt—$WO_2$ and CoCrPt—$WO_3$.

In the case when the oxygen-containing magnetic layer has a granular structure wherein a magnetic alloy and an oxide are present as discrete particles, the reactivity of the magnetic layer with a reactive plasma or a reactive ion tends to increase to undesirably large extent with the result that a pattern formed at the exposure to the reactive plasma or the reactive ion is liable to be blurred. Therefore, it is preferable in the present invention to form an oxygen-containing magnetic layer having a non-granular structure wherein a magnetic alloy is chemically bonded to an oxide.

The crystalline structure of the magnetic layer formed in the method of the present invention is preferably a hexagonal close-packed (hcp) structure. In the magnetic layer having a hexagonal close-packed structure, its (002) crystal plane is occasionally orientated in the direction parallel to the surface of substrate, i.e., the crystalline c axis ([002] axis) is occasionally orientated in the perpendicular direction thereto. In such a perpendicular magnetic layer, when the magnetic layer contains 0.5 atomic % to 6 atomic % of an oxide, the reactivity of the magnetic layer with a plasma can be enhanced. However, the inventors have found that, in the case when the crystalline c axis is orientated in parallel to the surface of substrate, a pattern formed tends to be clear and sharp as compared with the pattern formed with the crystalline c axis orientated perpendicularly to the surface of substrate. Therefore, the magnetic layer formed in the method of the present invention is preferably an in-plane orientated magnetic layer. It is also preferable that the magnetic layer has a multi-layer structure comprised of an upper magnetic layer which is an in-plane orientated magnetic layer, and a lower magnetic layer which is a perpendicularly orientated magnetic layer.

The orientation direction of the crystalline c axis in the magnetic layer can be evaluated by the half value width Δ (delta) θ50 of a rocking curve, which is determined as follows. A magnetic recording layer formed on a substrate is analyzed by X-ray diffractometry, i.e., the crystal face which is parallel to the substrate surface is analyzed by scanning the incident angle of X-ray. In the case when the magnetic layer has a hexagonal close-packed (hcp) crystalline structure as mentioned above, the diffraction peaks corresponding to the crystal face are observed. In the case of perpendicularly orientated magnetic layer comprising a cobalt alloy, the crystalline c axis ([002] axis) in the hcp structure is orientated in the direction perpendicular to the substrate surface, and therefore, the diffraction peaks attributed to the (002) crystal face are observed.

Then the optical system is swung relative to the substrate surface while a Bragg angle diffracting the (002) crystal face is maintained. The diffraction intensity of the (002) crystal face relative to the angle at which the optical system is inclined is plotted to draw a rocking curve with a center at a swung angle of zero degree. If the (002) crystal faces are in parallel with the substrate surface, a rocking curve with a sharp shape is obtained. In contrast, if the (002) crystal faces are broadly distributed, a rocking curve with a broadly widened shape is obtained.

Thus, the crystal orientation (perpendicular orientation or in-plane orientation) in the magnetic layer can be evaluated on the basis of the half value width Δ (delta) θ50 of the rocking curve. The smaller the half value width Δ (delta) θ50, the higher the perpendicular orientation.

The magnetic layer is usually formed by a sputtering method.

The magnetic layer usually has a thickness in the range of 3 nm to 20 nm, preferably 5 nm to 15 nm. The thickness of the magnetic layer is determined so that sufficiently high input and output head powers can be obtained in consideration of the kind of magnetic alloy and the multi-layer structure. The magnetic layer has a thickness of at least certain value so as to obtain an output power of at least certain level at reproduction. However, parameters relating to the recordation-reproduction characteristics are generally deteriorated with an increase of the output power. Therefore an optimum thickness of magnetic layer should be chosen in consideration of the output power and the recordation-reproduction characteristics.

The process for producing the magnetic recording medium according to the present invention as specifically exemplified in FIG. 3 and FIG. 4 comprises the following steps A through I.

As illustrated in FIG. 3,

Step A of forming a magnetic layer 2 on a non-magnetic substrate 1.

Step B of forming a mask layer 3 on the magnetic layer 2.

Step C of forming a resist layer 4 on the mask layer 3.

Step D of transferring a negative magnetic recording pattern onto the resist layer 4 by using a stamp 5. The negative magnetic recording pattern refers to a negative pattern having depressions formed on the resist layer, which depressions have been formed in the regions for separating recording tracks formed on the magnetic layer. The arrow in step D in FIG. 3 refers to the direction in which the stamp 5 moves.

Step E of selectively removing the portions of the mask layer 3, which portions form depressions corresponding to the negative pattern of the magnetic recording pattern as illustrated in step D. In the case when the resist layer partially remains in the depressions in step D, both of the residual resist layer 8 and the mask layer 3 in the depressions are removed in step E.

As illustrated in FIG. 4,

Step F of exposing to milling ion 6 the depressions of the surface layer of magnetic layer 2, corresponding to the regions from which the resist layer 4 and the mask layer 3 have been removed, thereby removing the surface layer portions in the ion-milled regions of magnetic layer. Reference numeral 7 indicates the ion-milled regions of the surface layer of magnetic layer, and reference letter d indicates the thickness of the surface layer portions of magnetic layer which have been removed by ion-milling.

Step G of exposing the ion-milled regions 7 of the magnetic layer, from which the surface layer portions of magnetic layer have been removed, to a reactive plasma or a reactive ion 10, thereby modifying the magnetic characteristics of the regions 7 of magnetic layer, and further removing the residual resist layer 4 and the residual mask layer 3.

Step H of irradiating the exposed surface of the magnetic layer 2 with an inert gas 11.

Step I of coating the exposed surface of magnetic layer 2 with a protective overcoat 9.

The above-mentioned steps A through I are carried out in the above-recited order.

The above-mentioned step F of exposing to milling ion 6 the depressions of the surface layer of magnetic layer 2, is preferably carried out, but the step F is not essential. In the case when the ion-milling step F is omitted, the surface of magnetic layer which has been exposed by the removal of mask layer 3 in step E is exposed to a reactive plasma or a reactive ion 10 in step G.

The mask layer 3, formed on the magnetic layer 2 in step B in the process for producing the magnetic recording medium according to the present invention, is formed preferably from at least one material selected from Ta, W, Ta nitride, W nitride, Si, $SiO_2$, $Ta_2O_5$, Re, Mo, Ti, V, Nb, Sn, Ga, Ge, As and Ni. By using these materials, the shieldability of the mask layer 3 against milling ion 6 can be enhanced and the formability of the magnetic recording pattern by the mask layer 3 can also be enhanced. These materials can easily be removed at dry etching step using a reactive gas, and therefore, in step H shown in FIG. 4, residual mask layer can be minimized and staining of the exposed surface of magnetic recording medium layer can be avoided or minimized.

Among the mask layer-forming materials used in the mask layer-forming step B, As, Ge, Sn and Ga are preferable. Ni, Ti, V and Nb are more preferable, and Mo, Ta and W are most preferable.

The mask layer 3 preferably has a thickness in the range of 1 nm to 20 nm.

In the production method of the present invention, after a negative pattern of the magnetic recording pattern is transferred onto the resist layer 4 in step D shown in FIG. 3, the depressed regions 8 of resist layer 4 preferably have a thickness in the range of 0 to 10 nm. When the depressed regions 8 of resist layer have such thickness, the selective removal of the resist layer and the carbon layer in step E in FIG. 3 can be effected in an advantageous manner. That is, undesirable sagging at edge portions of the mask layer 3 can be avoided and the shieldability of the mask layer 3 against implanted ion 6 can be enhanced in step F in FIG. 4, and the formability of the magnetic recording pattern by the mask layer 3 also is enhanced. The resist layer preferably has a thickness in the range of approximately 10 nm to 100 nm.

In a preferred embodiment of the method for producing a magnetic recording medium according to the present invention, a material which can be cured upon irradiation with radiation is used as the material for forming the resist layer 4 in step C in FIG. 3; and, when a negative magnetic recording pattern is transferred onto the resist layer 4 by using a stamp 5 in step D, or after the transfer of negative magnetic recording pattern has been completed, the resist layer 4 is irradiated with radiation to be cured. In this preferred embodiment, the configuration of stamp 5 can be transferred on the resist layer 4 with high precision. Consequently, when the regions of the mask layer 3, corresponding to the negative pattern of the magnetic recording pattern, are removed by etching in step E in FIG. 3, undesirable sagging at edge portions of the mask layer 3 can be avoided and the shieldability of the mask layer 3 against milling ion 6 can be enhanced, and the formability of the magnetic recording pattern by the mask layer 3 can also be enhanced.

The radiation used for curing the curable material refers to electromagnetic waves in a broad sense which include heat rays, visible light, ultraviolet light, X rays and gamma rays. As specific examples of the curable material, there can be mentioned thermosetting resins which are curable by heat rays, and ultraviolet-setting resins which are curable by ultraviolet light.

In the method for producing a magnetic recording medium according to the present invention, in the step D of transferring a negative magnetic recording pattern onto the resist layer 4 by using a stamp 5, it is preferable that the stamp 5 is pressed on the resist layer 4 having high fluidity, and, while the resist layer is in a pressed state, the resist layer 4 is irradiated with radiation to be thereby cured, and thereafter the stamp 5 is removed from the resist layer 4. By this procedure, the configuration of the stamp can be transferred to the resist layer 4 with a high precision.

For irradiating the resist layer having high fluidity with radiation while the resist layer is in a pressed state, there can be adopted a method of irradiating a multi-layer structure comprising the resist layer with radiation by exposing the substrate side (i.e., the side opposite to the stamp-pressed resist layer) of the multi-layer structure to the radiation; a method of using a radiation-transmitting stamp, and exposing the stamp-pressed side of the multi-layer structure to radiation; a method of exposing the stamp-pressed resist layer to radiation by applying radiation from the side of the multi-layer structure; and a method of exposing the stamp-pressed side of the multi-layer structure or the opposite side (substrate side) thereof, with radiation exhibiting a high conductivity to a solid, such as heat rays.

In a preferred specific example of the procedure of irradiating the radiation-curable resist layer with radiation to cure the resist layer in the method of the present invention, an ultraviolet ray-curable resin such as novolak resin, an acrylic acid ester resin or a cycloaliphatic epoxy resin is used as the radiation-curable resist resin, and a stamp made of a highly ultraviolet ray-transmitting glass or resin is used.

By adopting the above-mentioned procedures, the magnetic characteristics such as, for example, the coercive force and the residual magnetization in the regions of partitioning the magnetic tracks (i.e., the regions of separating the magnetic layer into plural magnetic regions) can be reduced to the minimum values, and consequently, the letter bleeding at writing can be avoided and the areal recording density of the magnetic recording medium can be enhanced to a greater extent.

The stamp used in the pattern-transferring step D is preferably made by forming minute track patterns on a metal plate, for example, by electron beam lithography. The material used for forming the stamp is not particularly limited, provided that the purpose of the invention is not impaired, but, a material having a hardness sufficient for enduring over the process for producing the magnetic recoding medium, and having good durability, is preferably used. Such material includes, for example, nickel.

The patterns formed on the stamp include those which are conventionally used tracks for recording ordinary data, and further include patters for servo signal, such as burst patterns, gray code patterns and preamble patterns.

As illustrated in step F in FIG. 4, the surface layer portions in the depression regions of the magnetic layer are preferably removed by, for example, ion-milling 10, and thereafter, the newly exposed regions are exposed to a reactive plasma or a reactive ion, whereby the magnetic characteristics of said regions of magnetic layer are modified. The magnetic recording medium having such regions having modified magnetic characteristics has magnetic recording patterns exhibiting clear contrast and has a high SNR, as compared with those of the conventional magnetic recording medium having regions which have modified magnetic characteristics, but which have been prepared by a method wherein the surface layer portions in the depression regions of magnetic layer are not removed. This would be for the following reasons. First, by the removal of the surface layer portions in the regions of magnetic layer, the newly exposed regions become clearer and more activated, therefore, exhibit enhanced reactivity with a reactive plasma and a reactive ion; and secondly, surface defects such as minute voids are introduced in the newly exposed regions into which a reactive ion can easily be penetrated.

The thickness, as expressed by "d" in step F in FIG. 4, of the surface layer portions of magnetic layer which are removed by, for example, ion-milling 6, is preferably in the range of 0.1 nm to 15 nm, more preferably 1 nm to 10 nm. When the thickness of the removed surface layer portions is smaller than 0.1 nm, the above-mentioned benefits brought about by the removal of said surface layer portions are insufficient. In contrast, when the thickness of the removed portions is larger than 15 nm, the resulting magnetic recording medium has a poor surface smoothness and a resulting magnetic recording-reproducing apparatus has a poor head-floating property.

In the present invention, the regions of the magnetic layer, which magnetically partition, for example, the magnetic recording tracks and servo signal patterns from each other are characterized as being formed by the exposure to a reactive plasma or a reactive ion whereby the magnetic characteristics of said regions of magnetic layer are modified or degraded.

By the term "magnetically partitioned magnetic recording pattern" as used in the present specification is meant, as illustrated in step G in FIG. 4, the magnetic recording pattern which is partitioned by the modified or demagnetized regions (depressions) of the magnetic layer 2 as seen when the multilayer structure is viewed from the front side. The object of the present invention can be achieved in an embodiment wherein, in the case when the magnetic layer 2 is partitioned by the modified or demagnetized regions thereof in the upper surface portion of the magnetic layer 2, even though the magnetic layer 2 is not partitioned in the lowermost portion thereof. Therefore this embodiment also falls within the scope of the magnetically partitioned magnetic recording pattern as herein used.

By the term "magnetic recording pattern" as used herein is meant a magnetic recording pattern in a broad sense which include patterned media wherein magnetic recording patterns are arranged with a certain regularity per bit; media wherein magnetic recording patterns are arranged in tracks fashion; and servo signal patterns.

The process of the present invention is preferably adopted for the manufacture of a discrete type magnetic recoding medium in view of simplicity and ease, wherein the magnetically partitioned magnetic recording pattern involves magnetic recoding tracks and servo signal patterns.

The modification of the magnetic layer as conducted for forming the magnetic recording pattern in the present invention refers to at least partially changing the magnetic characteristics (more specifically, lowering the coercive force or the residual magnetization, as well as demagnetization) of the magnetic layer in specified regions thereof for the formation of magnetic recording pattern.

The above-mentioned regions of the magnetic layer, which magnetically partition, for example, the magnetic recording tracks and servo signal patterns from each other, can be formed by amorphization of the specific regions by exposure to a reactive plasma or a reactive ion. Thus, the magnetic characteristics of the regions of magnetic layer can be modified also by changing the crystalline structure of the magnetic layer (more specifically, by amorphization of the magnetic layer) in specified regions thereof by exposing said specified regions to a reactive plasma or a reactive ion for the formation of the regions for magnetically partitioning the magnetic recording tracks and servo signal patterns.

The amorphization of the magnetic layer in the present invention refers to that the atomic arrangement in the magnetic layer is changed to an irregular atomic arrangement with no long-distance order. More specifically it refers to that microcrystalline particles having a size of smaller than 2 nm are arranged in random. This arrangement in random of the microcrystalline particles can be confirmed by the absence of peaks attributed to the crystalline plane or by the presence of halo alone by X-ray diffraction analysis or electron-ray diffraction analysis.

The reactive plasma as used in the present invention includes, for example, inductively coupled plasma (ICP) and reactive ion plasma (RIE). The reactive ion as used in the present invention includes, for example, reactive ions present in the above-mentioned inductively coupled plasma and reactive ion plasma.

The inductively coupled plasma as used herein refers to a high-temperature plasma which is obtained by imposing a high voltage to a gas thereby forming a plasma, and further applying magnetic variation at a high frequency to generate joule heat due to over-current inside the plasma. The inductive coupled plasma has a high electron density, and, can modify the magnetic characteristics of magnetic layer with a high efficiency in a magnetic film with a broad-area, as compared with the case of making discrete track media conventionally using an ion beam.

The reactive ion plasma as used herein refers to a highly reactive plasma which is obtained by incorporating a reactive gas such as $O_2$, $SF_6$, $CHF_3$, $CF_4$ or $CCl_4$ in a plasma. When such reactive ion plasma having incorporated therein a reactive gas is used as the reactive plasma in the process of the present invention, said plasma can modify the magnetic characteristics of the magnetic layer with a higher efficiency.

The reactive plasma or the reactive ion as used in the present invention preferably contain a halogen. As the halogen ion, especially preferable is a halogen ion produced by introducing at least one gaseous halide selected from the group consisting of $CF_4$, $SF_6$, $CHF_3$, $CCl_4$ and $KBr$ into the reactive plasma or the reactive ion.

By the presence of a halogen in the reactive plasma or the reactive ion the reactivity of the magnetic layer with a plasma for the modification of the specified region of the magnetic layer is enhanced and the image of the resulting magnetic recording pattern becomes more sharp. The reason for which is not clear, but it is presumed that the halogen ion in the reactive plasma etches foreign matter deposited on the surface of the magnetic layer to make clean the surface of the magnetic layer with the result of enhancement of the reactivity of the magnetic layer. Further the clean surface of the magnetic layer is presumed to react the halogen ion with a high efficiency.

The modification of the magnetic layer is achieved by exposure to the reactive plasma or the reactive ion in the present invention. This modification is preferably effected by the reaction of magnetic metal constituting the magnetic layer with atoms or ions present in the reactive plasma or the reactive ion. This reaction involves invasion of atoms or ions into the magnetic metal and causing, for example, change of the crystalline structure of magnetic metal, change of the composition of magnetic metal, oxidation of magnetic metal, nitriding of the magnetic metal, and/or silicification of magnetic metal.

After the modification of the specific regions of the magnetic layer is carried out, the resist layer 4 and the mask layer 3 are removed as illustrated in the step G in FIG. 4. The removal of the resist layer 4 and the mask layer 3 can be carried out by, for example, a procedure of dry etching, reactive ion etching, ion milling or wet etching.

After the removal of the resist layer 4 and the masking layer 3, the magnetic layer having been activated in the steps F and G in FIG. 4 is exposed to an inert gas irradiation 11 in the step H, whereby the magnetic layer is stabilized, and occurrence of the migration of magnetic grains is avoided or minimized even under high-temperature and high-humidity conditions. The reason for which such benefits are obtained by the exposure to an inert gas irradiation is not clear. But, it is presumed that the inert element intrudes into the surface layer portion of the magnetic layer and consequently the migration of magnetic grains can be suppressed, and further that the surface layer portions activated by inert gas irradiation is removed and the migration of magnetic grains does not occur or occurs only to a minor extent.

As the inert gas, at least one gas selected from the group consisting of Ar, He and Xe is preferably used in view of the stability and the enhanced effect of suppressing the migration of magnetic grains.

The exposure to the inert gas irradiation is carried out preferably by a method using at least one means selected from the group consisting of ion gun, induced coupled plasma (ICP), and reactive ion plasma (RIE). Of these, ICP and RIE are preferable in view of enhanced intensity of irradiation. The ICE and the RIE are hereinbefore described.

After the exposure to an inert gas irradiation, a protective over coat 9 is preferably formed on the surface of the magnetic layer as illustrated in FIG. 4, step I, and then a lubricant (not shown in FIG. 4) is preferably coated on the protective overcoat.

The formation of the overcoat 9 can usually be effected by forming a diamond-like-carbon film by, for example, using P-CVD, but the method for forming the overcoat is not particularly limited.

The protective overcoat 9 can be formed from materials conventionally used for forming a protective overcoat, which include, for example, carbonaceous materials such as carbon (C), hydrogenated carbon ($H_xC$), nitrided carbon (CN), amorphous carbon and silicon carbide (SiC); and $SiO_2$, $Zr_2O_3$ and TiN. Two or more overcoats may be formed.

The thickness of the overcoat 9 is below 10 nm. If the thickness of the protective layer is larger than 10 nm, the distance between the head and the magnetic layer becomes undesirably large and the input and output powers are often insufficient.

A lubricating layer is preferably formed on the overcoat 9. The lubricating layer is formed from, for example, a fluorine-containing lubricant, a hydrocarbon lubricant or a mixture thereof. The thickness of the lubricating layer is usually in the range of 1 to 4 nm.

The constitution of an example of the magnetic recording-reproducing apparatus made by the process according to the present invention is illustrated in FIG. 5. The magnetic recording-reproducing apparatus of the present invention comprises, in combination, the above-mentioned magnetic recording medium 30 of the invention; a driving part 34 for driving the magnetic recording medium in the recording direction; a magnetic head 31 comprising a recording part and a reproducing part; means (head-driving part 33) for moving the magnetic head 31 in a relative motion to the magnetic recording medium 30; and a recording-and-reproducing signal treating means 32 for inputting signal into the magnetic head 31 and for reproduction of output signal from the magnetic head 31.

The magnetic recording-reproducing apparatus comprising the combination of the above-mentioned means can provide a high recording density. More specifically, in the magnetic recording medium of the magnetic recording-reproducing apparatus, the magnetic recording tracks are magnetically discrete, and therefore, the recording head width and the reproducing head width can be approximately the same size as each other with the result of sufficiently high reproducing output power and SNR. This is in a striking contrast to the conventional magnetic recording medium wherein the reproducing head width must be smaller than the recording head width to minimize the influence of the magnetization transition regions in the track edges.

By constituting the reproducing part of the magnetic head as GMR head or TMR head, a sufficiently high signal intensity can be obtained even at a high recording density, that is, the magnetic recording apparatus having a high recording density can be provided.

When the head is floated at a floating height in the range of 0.005 µm to 0.020 µm, which is lower than the conventionally adopted floating height, the output power is increased and the SNR becomes large, and thus the magnetic recording apparatus can have a large size and a high reliability.

If a signal treating circuit using a sum-product composite algorithm is combined in the magnetic recording medium, the recording density can be much more enhanced, and a sufficiently high SNR can be obtained even when recordation-reproduction is carried out at a track density of 100 k-tracks or more per inch, or a linear recording density of 1000 k-bit or more per inch, and a high recording density of at least 100 G-bit or more per square inch.

EXAMPLES

The invention will now be specifically described by the following examples.

Examples 1 to 11, and Comparative Examples 1 and 2

A glass substrate for HD was placed in a vacuum chamber and the chamber was vacuumed to a pressure of not higher than $1.0 \times 10^{-5}$ Pa to remove the air. The glass substrate used was comprised of glass ceramics having a composition of $Li_2Si_2O_5$, $Al_2O_3$—$K_2O$, MgO—$P_2O_5$ and $Sb_2O_3$—ZuO, and has an outer diameter of 65 mm and an inner diameter of 20 mm, and an average surface roughness (Ra) of 2 angstroms.

On the glass substrate, a soft magnetic underlayer composed of 65Fe-30Co-5B, an intermediate layer composed of Ru and a first magnetic layer (lower magnetic layer) having a granular structure comprised of perpendicularly orientated magnetic grains, and a second magnetic layer (upper magnetic layer) having a non-granular structure comprised of in-plane orientated magnetic grains were formed in this order by a DC sputtering method. The first magnetic layer was comprised of a Co-10Cr-20Pt-8 ($SiO_2$) alloy (the numerals immediately before the elements indicate percents by mole of the elements) and had a thickness of 100 angstroms. The second magnetic layer was comprised of a base alloy of Co-14Cr-14Pt-4B and an oxide shown in Table 1, below, and had a thickness of 50 angstroms. The FeCoB soft magnetic underlayer had a thickness of 600 angstroms, and the Ru intermediate layer had a thickness of 100 angstroms.

Then a tantalum mask layer having a thickness of 60 nm was formed on the second magnetic layer by sputtering. The mask layer was coated with a resist by a spin-coating method. The resist was comprised of an ultraviolet ray-curable novolak resin and had a thickness of 100 nm.

A glass stamp having a negative pattern corresponding to the desired magnetic recording pattern was pressed onto the resist layer at a pressure of 1 MPa (about 8.8 kgf/cm$^2$). The glass stamp had an ultraviolet ray transmission of at least 95%. While the stamp was pressed onto the resist layer, the upper surface of the stamp was irradiated with ultraviolet ray having a wavelength of 250 rut for 10 seconds to cure the resist layer. Thereafter the stamp was separated from the resist layer thereby transferring a magnetic recording pattern on the resist layer. The thus-transferred magnetic recording pattern had a configuration such that the elevations in the resist layer are circular with a width of 120 nm, and the depressions in the resist layer are circular with a width of 60 nm. The thickness of the patterned resist layer was 80 nm and the thickness of the depressed portions of the resist layer was about 5 nm. The depressed portions had an angle of about 90 degrees to the substrate surface.

The depressed portions of the resist layer and the corresponding portions of the tantalum mask layer were removed by dry etching. The dry etching for the resist layer was carried out under the following conditions. O$_2$ gas flow rate: 40 scorn, pressure: 0.3 Pa, high frequency plasma power: 300 W, DC bias voltage: 30 W, and etching time: 10 seconds. The dry etching for the tantalum layer was carried out under the following conditions. CF$_4$ gas flow rate: 50 sccm, pressure: 0.6 Pa, high frequency plasma power: 500 W, DC bias voltage: 60 W, and etching time: 30 seconds.

In Example 11 and Comparative Example 2, the exposed surface portions of the magnetic layer corresponding to the removed depressed portions of the resist layer and the tantalum mask layer were removed by ion milling using an Ar ion. The ion milling conditions were as follows. High frequency output power: 800 W, acceleration voltage: 500 V, pressure: 500 V, pressure: 0.014 Pa, argon gas flow rate: 5 sccm, ion-milling time: 40 seconds, and current density: 0.4 mA/cm$^2$.

Thereafter, in Example 11 and Comparative Example 2, the ion-milled surface portions of the magnetic layer were exposed to a reactive plasma or a reactive ion to modify the magnetic properties of the surface portions of the magnetic layer.

In contrast, in Examples 1-10 and Comparative Example 1, the exposed surface portions of the magnetic layer corresponding to the removed depressed portions of the resist layer and the tantalum mask layer were not subjected to ion-milling, but, were directly exposed to a reactive plasma or a reactive ion to modify the magnetic properties of the surface portions of the magnetic layer.

In all of the examples and comparative examples, the exposure to the reactive plasma was carried out using an inductively coupled plasma (ICP) apparatus ("NE550" available from ULVAC Inc.). The plasma emission conditions were as follows. Flow rate of CF$_4$: 90 cc/min, input power; 200 W, pressure within the apparatus: 0.5 Pa, and treating time: 50 seconds. After the exposure to CF$_4$, the exposure to oxygen gas was carried out for 50 seconds.

Thereafter, residual portions of the resist layer and residual portions of the mask layer, which remained on the surface of the multi-layer structure, were removed by dry etching under the following conditions. Flow rate of SF$_6$ gas: 100 sccm, pressure: 2.0 Pa, high frequency plasma power: 400 W, and treating time: 300 seconds.

Thereafter the surface of the magnetic layer was irradiated with an inert gas plasma under the following conditions. Flow rate of inert gas: 5 sccm, pressure: 0.014 Pa, acceleration voltage: 300 V, current density: 0.4 mA/cm$^2$, and treating time: 5, 10, 15 or 25 seconds.

A protective overcoat of carbon (DLC: diamond-like carbon) with a thickness of 4 nm was formed by a CVD method, and finally the multi-layer structure was coated with a lubricant to form a lubricating film. Thus, the manufacture of a magnetic recording medium was completed.

The electromagnetic conversion characteristics of the magnetic recording medium were evaluated by using a spin stand. A vertical recording head and a TuMR reading head were used for the evaluation. The electromagnetic conversion characteristics were evaluated by the comparison of the amount of magnetization as measured on the regions of magnetic layer which have not been exposed to the reactive plasma, with the amount of magnetization as measured on the regions of magnetic layer having been exposed to the reactive plasma.

TABLE 1

| Example No. | Oxide added in upper magnetic layer | Amount of oxide added (atmic %) | Ar ion-milled thickness (nm) *1 | Amount of magnetization (memu/cm$^2$) | | % of reduction in magnetization |
|---|---|---|---|---|---|---|
| | | | | Non-treated region *2 | Treated region *3 | |
| Ex. 1 | SiO$_2$ | 0.5 | 0 | 0.35 | 0.11 | 69% |
| Ex. 2 | SiO$_2$ | 2 | 0 | 0.34 | 0.06 | 82% |
| Ex. 3 | SiO$_2$ | 4 | 0 | 0.33 | 0.04 | 88% |
| Ex. 4 | SiO$_2$ | 6 | 0 | 0.34 | 0.01 | 97% |
| Ex. 5 | TiO$_2$ | 1 | 0 | 0.33 | 0.08 | 76% |
| Ex. 6 | TiO$_2$ | 4 | 0 | 0.35 | 0.05 | 86% |
| Ex. 7 | TiO$_2$ | 6 | 0 | 0.34 | 0.01 | 97% |
| Ex. 8 | WO$_2$ | 4 | 0 | 0.34 | 0.05 | 85% |
| Ex. 9 | WO$_3$ | 4 | 0 | 0.35 | 0.06 | 83% |
| Ex. 10 | Cr$_2$O$_3$ | 4 | 0 | 0.33 | 0.13 | 61% |
| Ex. 11 | SiO$_2$ | 4 | 3 | 0.29 | 0.03 | 90% |

TABLE 1-continued

| Example No. | Oxide added in upper magnetic layer | Amount of oxide added (atmic %) | Ar ion-milled thickness (nm) *1 | Amount of magnetization (memu/cm²) | | % of reduction in magne-tization |
|---|---|---|---|---|---|---|
| | | | | Non-treated region *2 | Treated region *3 | |
| Co. Ex. 1 | — | 0 | 0 | 0.34 | 0.28 | 18% |
| Co. Ex. 2 | — | 0 | 3 | 0.29 | 0.21 | 28% |

Note
*1 Thickness of surface layer portions of magnetic layer removed by Ar milling
*2 Amount of magnetization as measured on reactive plasma non-treated region
*3 Amount of magnetization as measured on reactive plasma treated region

INDUSTRIAL APPLICABILITY

According to the present invention drawn to a method for producing a magnetic recording medium, a magnetic recording medium exhibiting high electromagnetic conversion characteristics and having a high recording density can be produced with an enhanced productivity.

The invention claimed is:

1. A method for producing a magnetic recording medium having a magnetically partitioned magnetic recording pattern, characterized by comprising a step of forming a magnetic layer on a non-magnetic substrate, which layer contains an oxide in an amount in the range of 0.5 atomic % to 6 atomic %, as atomic % of metal constituting the oxide to the atomic % of a magnetic alloy in the magnetic layer, and has a non-granular structure; and a step of exposing regions of the magnetic layer, which magnetically partition the magnetic recording pattern, to a reactive plasma or a reactive ion.

2. The method for producing a magnetic recording medium according to claim 1, wherein the magnetic layer containing 0.5 atomic % to 6 atomic % of an oxide is an in-plane orientated magnetic layer.

3. The method for producing a magnetic recording medium according to claim 1, wherein the oxide is at least, one oxide selected from the group consisting of $SiO_2$, $TiO_2$, $WO_2$, $WO_3$ and $Cr_2O_3$.

4. The method for producing a magnetic recording medium according to claim 1, wherein the reactive plasma or the reactive ion contains a halogen ion.

5. The method for producing a magnetic recording medium according to claim 4, wherein the halogen ion is a halogen ion produced by introducing at least one gaseous halide selected from the group consisting of $CF_4$, $SF_6$, $CHF_3$, $CCl_4$ and KBr into the reactive plasma.

6. The method for producing a magnetic recording medium according to claim 1, which further comprises a step of, after the step of exposing said regions of the magnetic layer to a reactive plasma or a reactive ion, exposing said regions of magnetic layer having been exposed to a reactive plasma or a reactive ion, to an oxygen plasma.

7. The method for producing a magnetic recording medium according to claim 1, wherein said regions of the magnetic layer to be exposed to a reactive plasma or a reactive ion are surface portions of the magnetic layer.

8. The method for producing a magnetic recording medium according to claim 1, wherein surface layer portions in said regions of magnetic layer to be exposed to a reactive plasma or a reactive ion are removed, and then, the surface portions of the magnetic layer which have been newly exposed by the removal of the surface layer portions, are exposed to a reactive plasma or a reactive ion.

9. The method for producing a magnetic recording medium according to claim 8, wherein the removal of the surface layer portions in said regions of magnetic layer to be exposed to a reactive plasma or a reactive ion is effected to an extent such that surface layer portions having a thickness in the range of 0.1 to 15 nm are removed.

10. The method for producing a magnetic recording medium according to claim 1, which further comprises a step of, after the step of exposing said regions of the magnetic layer to a reactive plasma or a reactive ion, irradiating with an inert gas a surface at least in said regions of magnetic layer having been exposed to the reactive plasma or the reactive ion.

* * * * *